T. C. MERZ.
ANTIFRICTION DEVICE FOR LEAF SPRINGS.
APPLICATION FILED DEC. 5, 1914.

1,160,309.  Patented Nov. 16, 1915.

WITNESSES  INVENTOR
Theodore C. Merz
BY
Raymond A. Parker
ATTORNEY

UNITED STATES PATENT OFFICE.

THEODORE C. MERZ, OF DETROIT, MICHIGAN.

ANTIFRICTION DEVICE FOR LEAF-SPRINGS.

1,160,309.  Specification of Letters Patent.  Patented Nov. 16, 1915.

Application filed December 5, 1914. Serial No. 875,561.

*To all whom it may concern:*

Be it known that I, THEODORE C. MERZ, citizen of the United States, residing at Detroit, county of Wayne, State of Michigan, have invented a certain new and useful Improvement in Antifriction Devices for Leaf-Springs, and declare the following to be a full, clear, and exact description of the same, such as will enable others skilled in the art to which it pertains to make and use the same, reference being had to the accompanying drawings, which form a part of this specification.

This invention relates to an anti-friction device for placing between two leaves of a spring of a vehicle. One of these devices may be used between each pair of contacting leaves and in the ordinary elliptical or semi-elliptical springs, one device may be used at each end of each pair of contacting leaves.

Figure 2:
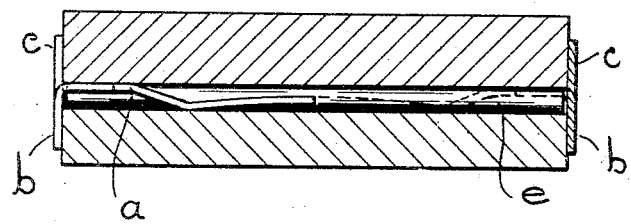
Figure 1:
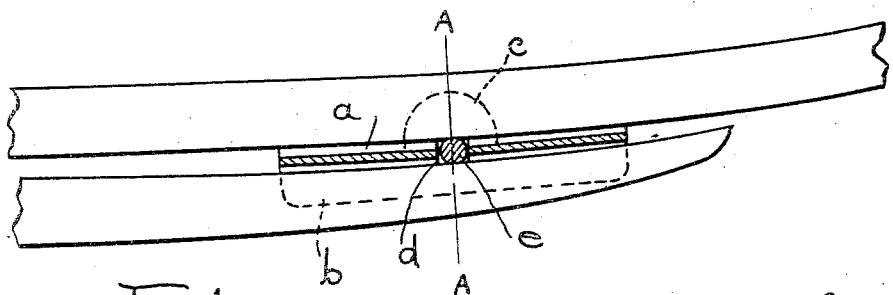
Figure 3:
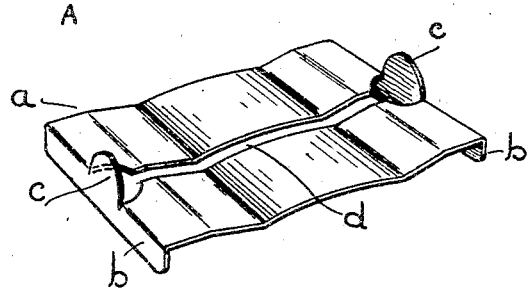
Figure 4:

In the drawings.—Figure 1 is a fragmentary view of a pair of leaves of a vehicle spring showing the anti-friction device separating the two leaves. Fig. 2 is a cross section on the line A A of Fig. 1. Fig. 3 is a perspective of the casing of the anti-friction device. Fig. 4 is a fragmentary view of a leaf spring showing several of the anti-friction devices in place.

The action of leaf springs, especially on automobiles, is often not very free. This makes the spring stiff and unyielding. To obviate this, it has been proposed to lubricate the springs by spreading them and inserting a lubricant, and in fact, springs have been built with conduits for conveying the lubricant between the leaves to secure a freer action of the independent leaves.

It is the object of the present invention to accomplish this without lubrication by inserting an anti-friction device, which not only serves the place of the lubricant but secures what I believe to be an even freer action by giving the adjoining leaves a rolling member upon which to bear.

$a$ designates the casing, which comprises a plate corrugated longitudinally of the spring leaves for the purpose of contacting both of the adjoining leaves so as to hold the casing in position.

$b\ b$ are flanges turned down at the sides of the casing for engaging the under leaf to prevent the casing from drawing out the sides of the springs.

$c\ c$ are ears cut out of the web of the casing and projecting vertically for the purpose of encountering the sides of the upper leaf of the spring to prevent the device from being pulled out.

The plate is provided with a cross slot $d$ which reaches from side to side and is adapted to hold the roller $e$. By reason of the corrugated end of the casing, the roller is securely held in place but freely so that it may rotate without any trouble.

The corrugated portions of the casing restrain the roller $e$ in place without the liability of being drawn between the roller and one of the springs which would happen if no suitable spacing devices were used. The corrugations also bear yieldingly on the leaves so as to cause little friction when one leaf moves relatively to another and yet have sufficient grip to prevent the devices from working out of position and perhaps being ejected from the end of the spring. Of course, if the corrugation did not bear directly on both adjacent spring leaves it would prevent the plate $a$ from being drawn in between the roller and leaves. I, therefore, claim the invention both as bearing against the leaves and without reference to bearing against the leaves.

What I claim is:

1. An anti-friction device for interposing between the leaves of a spring, comprising a corrugated plate adapted to bear against both of the adjoining leaves by reason of its corrugations, and an anti-friction member journaled in said corrugated plate.

2. An anti-friction device for interposing between the leaves of a spring, comprising a plate having corrugations running longitudinally of the leaves of a spring, said plate being provided with a cross slot running perpendicularly to the corrugations and a roller freely journaled in said cross slot.

3. An anti-friction device for interposing between the leaves of a spring, comprising a plate corrugated longitudinally of the springs and provided with turned over edges to engage the sides of the spring leaves, said plate being provided with a cross slot running perpendicularly of the direction of the corrugations, and a roller journaled freely in said cross slot.

In testimony whereof, I sign this specification in the presence of two witnesses.

THEODORE C. MERZ.

Witnesses:
　STUART C. BARNS,
　VIRGINIA C. SPRATT.